Sept. 13, 1949.  J. S. ROSS  2,481,879
COMPOSITION OF MATTER AND METHOD OF MAKING SAME
Filed Nov. 29, 1947
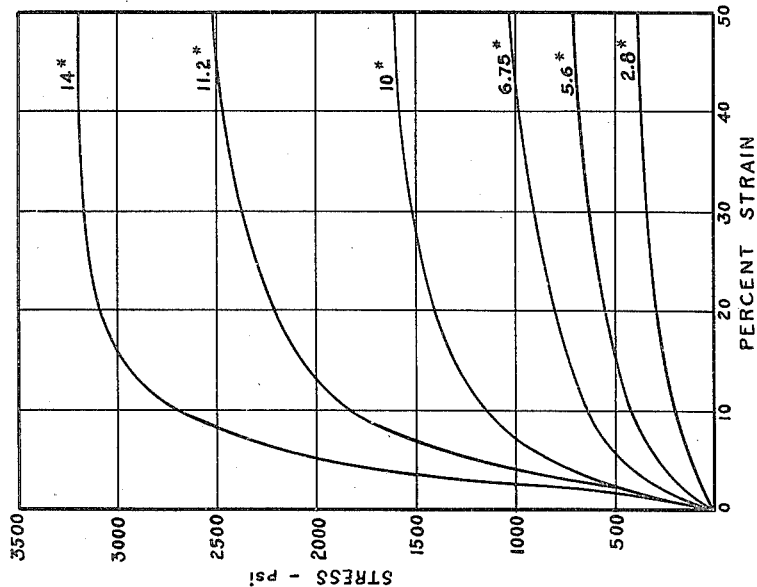
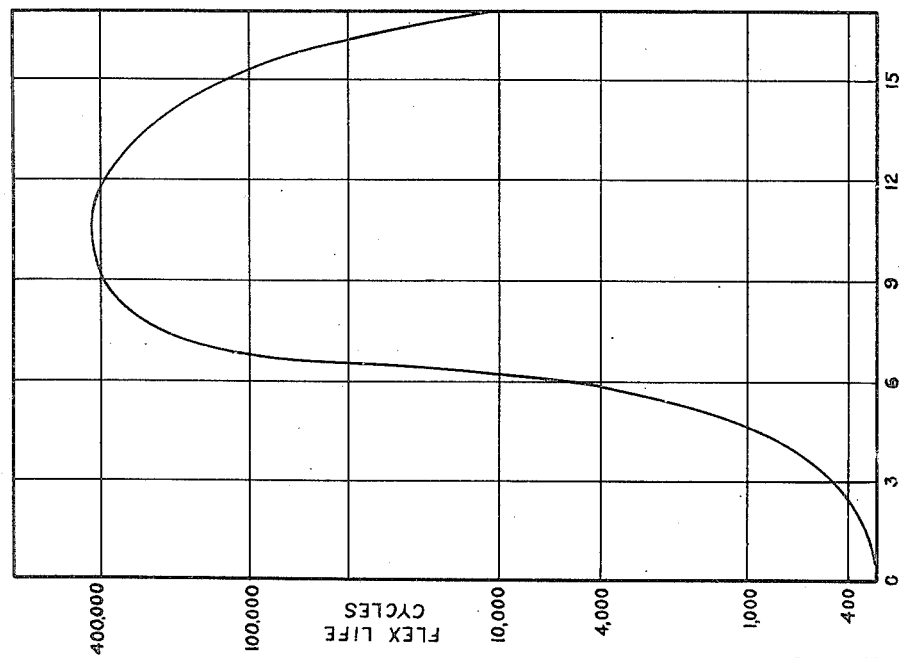
INVENTOR.
JACK S. ROSS
BY
Robert J. Patterson
ATTORNEY Patented Sept. 13, 1949

2,481,879

UNITED STATES PATENT OFFICE 2,481,879

COMPOSITION OF MATTER AND METHOD OF MAKING SAME

Jack S. Ross, Detroit, Mich., assignor to United States Rubber Company, New York, N. Y., a corporation of New Jersey Application November 29, 1947, Serial No. 788,920

10 Claims. (Cl. 260—7)

This invention relates to a composition of matter and to a method of making the same. More particularly it relates to a new composition of matter which has a wide variety of industrial applications and which upon treatment in accordance with the method hereinafter disclosed yields products which are very useful for many purposes.

The principal object of the present invention is to provide an improved composition of matter which behaves in an unusual manner and which is capable of yielding upon simple treatment a product which is very useful. Another object is to provide a simple and economical method of making final products from such a composition of matter. Another object is to provide as new articles of manufacture the final products so obtained. Another object is to provide a product which is particularly useful when manufactured in the form of sheet-like material. Another object is to provide a final product which is highly resistant to deterioration by chemicals including water, aromatic fuel, methyl ethyl ketone, ethylene dichloride, carbon tetrachloride, other organic solvents, 5% chromic acid solution, 10% caustic solution and ozone. Another object is to provide a product which is exceedingly flexible and which displays unusual physical properties among which is that of assuming a rubber-like or rubbery elastic state when it is stretched beyond its break point. Another object is to provide a flexible sheet-like material which does not crack but remains flexible after stretching beyond the break point, for example at folds. Numerous other objects of the present invention will more fully hereinafter appear.

In the accompanying drawing Fig. 1 portrays a graph showing the variation of flex life of a composite article composed of textile fabric layers cemented together with a composition of the present invention with varying relative proportions of the essential components of the composition of my invention and Fig. 2 illustrates the stress v. strain curves for various materials of the present invention.

I have discovered that a composition comprising, and preferably consisting essentially of, an aqueous mixture of dispersed polymerized chloroprene and dissolved partially condensed water-soluble resorcinol-formaldehyde resin capable upon removal of water of setting by further condensation to a substantially infusible, substantially insoluble state, which mixture contains polymerized chloroprene and said resin in such relative proportions that the resorcinol content of the partially condensed resin ranges from 3.8 to 16.8 and preferably from 6.75 to 15.0 per cent by weight based on the weight of polymerized chloroprene, and which mixture further contains at least 30 per cent by weight of said polymerized chloroprene and said partially condensed resin, has the unusual property of setting or solidifying upon standing for a relatively short time to a friable solid gel condition which upon subsequent drying to remove the water yields a strong flexible material having very unusual properties. For example, if such an aqueous composition is placed between two layers of textile fabric as by coating one layer of fabric with the composition and then contacting the coated surface with another layer before the composition has reached the point of gelling and the resulting layers held immobilized with respect to each other until after the composition is gelled and the assemblage thereafter dried to remove the water from the gelled composition while maintaining the immobilized condition at least until drying is nearly complete, there is obtained a composite article which has very high flex life, toughness, permanence, and other characteristics rendering it suitable for use under severe conditions such as are encountered by belting, shock pads, etc.

The proportion of polymerized chloroprene plus partially condensed resorcinol-formaldehyde resin in the aqueous composition is very critical and satisfactory results cannot be obtained if the percentage of these two components is below 30 per cent by weight of the composition. Preferably it is at least 35 per cent and it may range as high as 55 or even 60 per cent. Ordinarily a figure between 35 and 50 per cent is employed. For those methods of coating where relative high mobility of the composition is required, such as in dip-coating, the proportion of polymerized chloroprene and resin solids will range between 35 and 45 per cent.

Unless the proportion of polymerized chloroprene plus partially condensed resorcinol-formaldehyde resin in the original aqueous mixture is at least 30 per cent by weight, the composition will not gel to the solid friable gel state, the formation of which is essential to my invention. Unless the relative proportions of polymerized chloroprene and the partially condensed resin are with the limits given above, the resulting material obtained by gelling and drying of the composition described herein with immobilization of the material during the gelling and during the major portion of the drying step does not exhibit satisfactory flex life. This is shown by the curve of Fig. 1 of the drawing wherein flex life of a 4-ply fabric bonded with the composition of the present invention is plotted on a logarithmic scale against the proportion of resin based on the polymerized chloroprene, the resin proportion being expressed as parts by weight of resorcinol (combined in the partially condensed resin) per 100 parts of polymerized chloroprene. It will be seen that the flex life begins to rise sharply at a figure of 3.8 parts of resorcinol and falls off at 16.8 parts and that the peak of the curve which represents optimum flex life lies between 6.75 and 15.0 parts of resorcinol. When the proportion of partially condensed resin, expressed as parts of resorcinol, exceeds 16.8, the product is too rigid.

The speed with which the composition of the present invention gels to the requisite solid friable gel state is greatly affected by the temperature, increasing rapidly with temperature. Thus at room temperature, say 80° F., the original aqueous composition is fairly stable and may not gel for several hours, say for two to six hours. As the temperature rises above 90° F., the composition gels very rapidly and at 120° F. it gels almost immediately. This characteristic enables the manufacture of products in accordance with my invention to be speeded up by the application of moderate heating to the composition after it has been given the final shape desired, this moderate heating being applied until gelling is effected.

The speed of gelling of the composition is also greatly affected by the concentration of polymerized chloroprene plus partially condensed resorcinol-formaldehyde resin in the composition. Increase of this concentration by a few or even by a single per cent effects a considerable shortening of the gelling time.

Gelling is greatly accelerated by the phenomenon of absorption of the water from the composition by absorptive materials coated or in contact with the composition. For example if the original composition is poured upon stretched textile fabric, the soaking up of water by the textile fabric selectively removes water from the composition increasing its concentration with respect to polymerized chloroprene and partially condensed resorcinol-formaldehyde resin thereby greatly speeding up the gelling of the residual material in contact with the absorbent surface.

It is important that the aqueous composition be subjected to such conditions that it gels to the friable solid state which upon subsequent drying yields strong tough flexible material. There are a number of factors which determine whether gelling takes place or not. After application of the aqueous mixture or shaping thereof to the desired form, evaporation of volatiles, principally water, therefrom should be so limited that gelling takes place before any substantial surface evaporation occurs. If surface evaporation proceeds too rapidly so that the resin-forming reaction, which takes place in the water phase, is stopped before it can proceed to substantial completion, the product does not have the desired characteristics and is not satisfactory. An important factor in the attainment of the necessary gelling is the temperature of the material which is determined by two opposing forces, namely the cooling effect due to evaporation from the surface and the rate of input of heat either due to application of extraneous heat or produced by the exothermic resin-forming reaction. In the case of a composite article made by coating a plurality of layers of textile fabric with the aqueous mixture and plying the resulting coated layers together, substantially no evaporation of water from the interior of the assemblage can take place during the relatively short period of time required for gelling. In some cases the aqueous mixture after application to the surface or surfaces coated therewith or shaping may be subjected to non-evaporative conditions, for example by maintaining same in a heated atmosphere of controlled high humidity, until gelling has taken place. After gelling has been effected, the gelled composition may be dried in any suitable manner and rate.

The gelling of the composition of the present invention to a friable solid gel condition upon simple standing is entirely different from coagulation of compositions of the prior art by the addition of a coagulating agent. Attempts to use coagulation methods with the composition of my invention wholly fail to yield a satisfactory material.

The original aqueous composition of matter of my invention may be employed to make a solid resilient strong flexible material by simply allowing the composition which has been given the desired final shape, to stand either at room temperature or at moderately elevated temperatures until it sets to a friable gel condition followed by drying of the gelled material to remove the water therefrom. The original aqueous composition of my invention is unique in giving this intermediate friable gel condition in which the material has no strength or bonding properties and can be readily crumbled with the fingers. However, when this apparently useless gelled material is dried to remove the major proportion and preferably substantially all of the water therefrom, it is converted into an exceedingly strong, tough, flexible material which is capable of functioning as a substitute for leather for the manufacture of luggage and the like, shoe sole material, etc. or may be employed (by allowing gelling and drying to take place in situ) to bond layers of textile fabric together to produce belting, shock-resistant material, etc.

It is important that the composition be maintained in a relatively undisturbed condition, i. e. immobilized, durng the gelling step and during the major portion of the drying step, i. e. until substantially all the water has been removed. The material is usually dried to not over 10 per cent by weight of moisture before it is subjected to forces which would tend to disturb the relative positions of the various portions thereof. If the material is disturbed before it has taken its final set, i. e. before the major part of the water has been removed, it will be disintegrated into discrete portions and rendered worthless.

The aqueous composition of my invention is most conveniently prepared by simply mixing an aqueous dispersion of polymerized chloroprene with the proper portion of an aqueous solution of the settable partially condensed resorcinol-formaldehyde resin. The aqueous mixture may embody other ingredients enhancing its utility such as suitable proportions of fillers including any of the fillers commonly used in plastic and molded compositions, pigments, anti-oxidants for the polymerized chloroprene, dyestuffs, suspending agents, dispersing agents, wetting agents and dissolving agents, such as agents for holding the polymerized chloroprene and the fillers or pigments in suspension in the aqueous medium. The original aqueous mixture may have any suitable consistency depending upon the manner in which it is to be employed. It may contain ingredients solubilizing or holding in solution the partially condensed resorcinol-formaldehyde resin, a preferred example of such a material being an alkali metal hydroxide, typically sodium hydroxide. The composition will contain excess or unreacted formaldehyde for completing condensation of the resin and hardening such other components of the formulation as casein, glue, etc.

For example a composition made in accordance with my invention may contain in addition to the essential polymerized chloroprene and partially condensed resin ingredients, pigments such as zinc oxide, lithopone, etc., an anti-oxidant for the polymerized chloroprene such as phenyl beta naphthylamine, pigment suspending means such as alkali caseinate, e. g. ammonium caseinate, known wetting or dispersing agents, and preferably an excess of alkali metal hydroxide such as sodium hydroxide over that required to hold the resin in solution, such excess serving to catalyze completion of the resin-forming reaction.

If vulcanizable rubber is used in place of part or all of the polymerized chloroprene, in the less preferred practice of my invention disclosed below, vulcanizing ingredients, typically sulfur and conventional rubber accelerators, will be included in the formulation in amount sufficient to cure the vulcanizable rubber content of the mixture to a soft state if it were cured by itself.

The aqueous dispersion of polymerized chloroprene may be prepared in any known manner usually by polymerization of chloroprene in aqueous emulsion. It may contain the usual suspending agents, dispersing and wetting agent, anti-oxidants, etc.

The resin typically used in my invention is made by reacting resin-forming ingredients consisting of resorcinol and formaldehyde, the molar ratio of formaldehyde to resorcinol being sufficiently great to insure formation of a substantially infusible, substantially insoluble resin upon removal of the water of solution and of condensation, and usually being at least 2:1. The resorcinol-formaldehyde resin solution may be prepared in any manner known to those skilled in the art. The molar proportions of resorcinol and formaldehyde originally employed in formulating the resin may vary widely but usually a molar excess of formaldehyde over resorcinol is employed to give the ultimate formation of an insoluble infusible resin. The resorcinol and formaldehyde are preliminarily reacted together, the reaction being stopped before completion, i. e. before the condensation product has reached the insoluble infusible stage which may also be before all the formaldehyde has reacted. If desired the resorcinol may be reacted with a part only of the formaldehyde and the remainder of the formaldehyde may be added to the formulation at any time prior to use.

I often prefer to employ a molar ratio of total formaldehyde to resorcinol ranging from 2:1 to 3:1. Upon gelling and drying, the incomplete resin-forming reaction is carried to completion. The free formaldehyde present after the initial reaction is available to carry the reaction to completion during the drying step and also to harden and insolubilize any protein such as casein or glue present in the formulation. The preliminary resin-forming reaction may be conveniently carried out by forming a mixture of resorcinol and water at an elevated temperature, say 130° to 200° F., and adding the formaldehyde, e. g. in the form of commercial 37 to 40 per cent aqueous solution, with stirring. It may be desirable to add the formaldehyde gradually over a considerable period of time in view of the highly exothermic nature of the resin-forming reaction which, if allowed to get out of control, may yield a completely unusable resin. If desired, known catalysts for the resin-forming reaction such as oxalic acid, benzene sulfonic acid, etc. may be employed. Preferably however an alkali metal hydroxide, typically sodium hydroxide, is used as the condensing agent. After the resin-forming reaction has attained the desired stage, aqueous alkali metal hydroxide solution may be added to form the resin in solution which may be mixed with the polymerized chloroprene latex and the other ingredients to give the final formulation. There is preferably included in the final composition additional aqueous alkali metal hydroxide solution beyond that necessary to hold the partially condensed resin in solution.

Any desired proportions of pigments, fillers, etc. may be used in the composition depending upon the desired consistency of the mixture and the properties desired in the final dried gelled material. The proportion of casein or similar protein will usually not exceed 5 per cent. The proportion of alkali metal hydroxide in the final formulation will usually be at least 0.1 per cent but will not ordinarily exceed 2 per cent. These percentages are by weight of the total composition on a water-free basis.

When polymerized chloroprene is the only rubbery or elastomeric material present, as in the preferred practice of my invention, the preparation of the final product does not depend upon vulcanization and in fact no vulcanizing agents, accelerators or the like vulcanizing ingredients are used in such a composition, excellent results are obtained without vulcanization merely by allowing the composition to gel followed by drying to remove the water.

Where reference is made herein to the proportion of partially condensed resin (as where I refer to the percentage of the sum of polymerized chloroprene and resin) the sum of resorcinol and the total formaldehyde required to set the same to the insoluble infusible state is intended, although all such formaldehyde is not combined in the initial resin-forming condensation. Of course formaldehyde in excess of this requirement is not included although the amount of such excess would ordinarily be so small as to be almost inconsequential.

The aqueous mixture must be given its final shape prior to onset of gelling since articles shaped from the mixture after gelling has begun or is completed will not have enough strength to be useful. Similarly if the final product is to be associated with another material, such as a textile fabric in the case of a textile fabric-backed layer of the final product, the aqueous mixture must be associated in final relationship with such other material before gelling is initiated.

Ordinarily the composition of my invention is manufactured into relatively thin articles, i. e. articles not thicker than one-fourth of an inch. Production of articles of great thickness from the composition of my invention is difficult because it is difficult to effect the necessary removal of water from the interior of thick shapes without excessive shrinkage. Usually my composition is fabricated into final products in which it is not thicker than one-eighth of an inch. My composition is particularly applicable to the manufacture of a material in relatively thin continuous sheet-like form which is very suitable as a substitute for leather, for example for the manufacture of luggage and wherever similar flexible sheet-like material having good chemical resistance, strength, toughness and flexibility is desired. The material may be formed into an unsupported foil or film, for example by casting it onto a smooth surface, allowing it to gel thereon, drying the gelled material and stripping from the surface.

However I much prefer to manufacture the material of the present invention in association with a layer of textile fabric. For example the material may be formed as a relatively thin continuous sheet on the surface of a textile fabric in association with which the aqueous mixture is allowed to gel and then dried, the fabric serving to give it strength against tearing when it is stitched in the manufacture of luggage or the like. Without such backing of textile material, the material in common with other plastic materials, may exhibit an objectionable tendency to tearing or pulling away from the stitches.

The aqueous mixture may be spread, dip-coated, cast or applied in any other suitable manner to a layer of textile fabric whereupon the assembly may be allowed to gel and then dried to remove the water, care being taken to immobilize the assembly until gelling and the major part of the drying have taken place. The resulting material can be used directly or if desired it can be embossed or given any surface grain desired by pressing against a suitable engraved heated metallic surface.

One method of making a fabric-backed material which I have found to be very suitable is to stretch a sheet of textile fabric over a metallic plate, to then pour the aqueous composition which is of the desired consistency onto the surface of the stretched textile fabric and to then move a blade or knife edge across the material before it gels to give it a smooth surface. Upon standing the coated material rapidly gels whereupon the coated fabric may be dried in any suitable manner to give the final coated product which is removed from the metal plate.

The product of the present invention is unusual in many respects. Its unusual nature may be indicated by the fact that it develops approximately 50 per cent of its ultimate tensile strength before it is elongated 50 per cent. This is in contradistinction to ordinary rubber stock which will stretch several hundred per cent of its ultimate tensile strength before developing much strength. The material of the present invention has very good permanent set. The material is additionally unusual in that after it is stretched beyond the break point, i. e. the point at which the stress vs. elongation curve breaks quite sharply, it becomes elastic and rubbery, loses its original tensile strength and has good flexibility. This property is very advantageous in the manufacture of luggage or the like since at the folds, the material is stretched past the break point and becomes permanently rubbery and flexible and does not crack. This is desirable because it relieves the strain under which the material would otherwise be placed. The properties of the material are in sharp contrast to those of ordinary mill mixes of resonant rubber. An ordinary resin-rubber mill mix shows an original stress vs. elongation curve similar to that displayed by the material of the present invention. However when the material is stretched beyond the break point in a test and the test is repeated the ordinary mill mix shows the identical curve whereas the material of my invention, upon repetition of the test, shows a curve similar to that of rubber.

Fig. 2 of the drawings show the variation in stress-strain as the resin content (expressed as parts by weight of resorcinol per 100 parts of polychloroprene) varies. The curves in Fig. 2 are for the sheet film material without a textile backing. In these curves the stress in pounds per square inch is plotted against per cent strain or elongation.

The material of the present invention has extremely good abrasion resistance, being much superior to leather in this respect. This is particularly advantageous for such applications as luggage, book bindings, shoe soles, etc.

Following are several specific examples of the practice of my invention.

EXAMPLE I

This example illustrates the use of the principles of the present invention to make a composite textile fabric material which is very suitable for use as belting. A coating composition consisting essentially of a water dispersion of neoprene (polymerized chloroprene) latex and an aqueous solution of a partially condensed resorcinol-formaldehyde resin capable upon drying of setting to an insoluble infusible state, in admixture with a suspension of pigments and ammonium caseinate was made up of four separate recipes, identified as A, B, C and D which were admixed together in the following proportions by weight:

| | Parts by weight |
|---|---|
| Recipe A | 200 |
| Recipe B | 40 |
| Recipe C | 6 |
| Recipe D | 110 |
| | 356 |

Recipes A, B, C and D had the following compositions:

Recipe A

Recipe A was a water dispersion of neoprene latex containing approximately 50% of dispersed polymerized chloroprene.

Recipe B

| | Per cent by weight |
|---|---|
| Zinc oxide | 12.50 |
| Casein | 1.25 |
| Con. NH$_4$OH (29.4% NH) | 1.25 |
| Phenyl beta naphthylamine (anti-oxidant) | 5.00 |
| Lithopone | 30.00 |
| Sodium salt of short-chain-alkyl naphthalene sulfonic acid (dispersing agent) | 1.25 |
| Water | 48.75 |
| | 100.00 |

Recipe B was prepared as follows: The casein and ammonia were added to 20 parts of water and mixed for one hour in a ball mill. The remaining ingredients were then added and all the ingredients were mixed in the ball mill for a minimum of 8 hours. The resulting dispersion was stored in such a way as to permit agitation sufficient to prevent settling.

Recipe C

| | Per cent by weight |
|---|---|
| Dry caustic soda (76% commercial) | 10 |
| Water | 90 |

Recipe D

| | |
|---|---|
| Resorcinol | 40 lbs. |
| Water | 120 lbs. |
| Formaldehyde (37% aqueous solution) | 84 lbs. |
| Recipe C | 9 lbs. 10 oz. |
| Crushed ice | 188 lbs. |
| | 441 lbs. 10 oz. |

Recipe D was prepared in the following manner: The resorcinol was placed in the water which was at a temperature of approximately 150° F. After mixing, the formaldehyde was added and the batch was stirred until the resorcinol was dissolved. During this operation the temperature was maintained at from 115 to 120° F. by either heating or by adding small amounts of crushed ice. Thereafter the indicated portion of Recipe C was gradually added while the composition was agitated. Finally the remaining ice was added.

Recipes A, B, C and D were admixed together in any order and manner to give the final coating composition which contained about 33.3% by weight of polymerized chloroprene and resorcinol-formaldehyde resin. This composition must be utilized within about two to eight hours depending upon temperature.

A square woven cotton fabric was coated on both sides with the resulting composition and layers of the resulting wet coated material were placed in juxtaposition, allowed to stand until gelling took place and then dried at a temperature of 250° F. for one and a half hours. The resulting composite article exhibited a tensile strength of 1030 pounds per linear inch. Even after this material was aged for sixteen months while exposed to the elements with intermittent soaking with water, it still retained a tensile strength of 940 pounds per linear inch.

Examples II to IV illustrate typical recipes for colored materials which can be used to give a sheet film product, either backed or unbacked. These recipes may be prepared in the same way as disclosed above for Example I. The formulations of Examples II, III and IV are brown, black and ox-blood respectively.

EXAMPLE II

| | |
|---|---|
| Neoprene solids (polychloroprene) | 100.0 |
| Resorcinol | 10.0 |
| Formaldehyde | 5.5 |
| Zinc oxide | 5.0 |
| Lithopone | 12.0 |
| Casein | 0.5 |
| Ammonium hydroxide | 0.2 |
| NaOH | 0.8 |
| Sodium salt of alkyl naphthalene, sulfonic acid | 0.5 |
| Water | 213.0 |
| | 347.5 |

EXAMPLE III

| | |
|---|---|
| Neoprene solids | 100.0 |
| Resorcinol | 11.2 |
| Formaldehyde | 6.1 |
| Zinc oxide | 8.0 |
| Furnace carbon black | 7.5 |
| Casein | 0.5 |
| Ammonium hydroxide | 0.2 |
| NaOH | 0.7 |
| Sodium salt of alkyl naphthalene sulfonic acid | 0.5 |
| Water | 186.0 |
| | 320.7 |

EXAMPLE IV

| | |
|---|---|
| Neoprene solids | 100.0 |
| Resorcinol | 11.2 |
| Formaldehyde | 6.1 |
| Zinc oxide | 5.0 |
| Red pigment | 4.0 |
| Casein | 0.5 |
| Ammonium hydroxide | 0.2 |
| NaOH | 0.7 |
| Sodium salt of alkyl naphthalene sulfonic acid | 0.5 |
| Water | 186.2 |
| | 314.4 |

From the foregoing description it will be seen that I have provided a novel aqueous composition, method of utilizing the same and final composition. The final product of my invention has extremely high utility and can be manufactured by a simple and economical method involving merely allowing the original aqueous composition to gel by simple standing and then drying the gelled material.

Instead of using an aqueous dispersion of polymerized chloroprene (neoprene) in the practice of my invention I may less preferably use latices of elastic rubbery or rubber-like sulfur-vulcanizable materials such as GR-S (butadiene-styrene rubbery copolymer) latex, Buna N (butadiene acrylonitrile rubbery copolymer) latex, isoprene-styrene synthetic rubber latex, etc. in the same proportions as given above for neoprene latex. I may also use blends of such other rubbery materials in latex form with neoprene latex. However when latices of rubbery material other than neoprene are used it is necessary to include the conventional vulcanizing ingredients in the composition and to cure at a temperature sufficiently elevated to effect vulcanization of such other elastomeric material. Such temperatures are considerably above those required when neoprene is used as the sole rubbery component of the formulation. As explained above simple drying of the neoprene formulations at temperatures only sufficiently elevated to effect removal of the water is all that is required. Neoprene gives a much better product than the other rubbery materials. When a neoprene latex by itself is air-dried it gives a tacky film but the combination with the resorcinol-formaldehyde resin as described herein gives upon air-drying a tack-free film; with latices of other elastomers such as GR-S this reduction of tackiness by the resin is not nearly so pronounced. For these and other reasons, neoprene is by far the preferred elastomer.

While I much prefer to use resorcinol in the practice of my invention, I may use equivalent proportions of pyrogallol which gives a resin-forming reaction substantially the same as that described above for resorcinol. Resorcinol and pyrogallol are similar, both being polyhydric phenols having hydroxyl groups in the 1- and 3-positions on the benzene ring, pyrogallol differing from resorcinol in having the 2-position also occupied by hydroxyl.

Instead of pure resorcinol, I may with substantially equivalent results use commercial resorcinol which contains related phenolic bodies as impurities and usually contains at least 95% of resorcinol.

Instead of formaldehyde I may use equivalent proportions of other water-soluble aldehydes capable of giving the resin-forming reaction with resorcinol or pyrogallol. Examples are other aliphatic aldehydes such as acetaldehyde, propionaldehyde, butyraldehyde, etc. I may even use furfural although when it is used I prefer to use it only in making the partially condensed water-soluble resin and to use an aliphatic aldehyde such as formaldehyde or a homolog thereof in the formulation to complete the resin-forming reaction. I may use one aliphatic aldehyde in the initial resin-forming reaction and use another in the formulation to carry this reaction to completion; thus I may employ formaldehyde in making the partially condensed resin and then a homolog such as acetaldehyde or propionaldehyde to complete the reaction; or acetaldehyde first and then formaldehyde to complete the reaction; or propionaldehyde first and then formaldehyde or acetaldehyde.

I prefer to use resorcinol in conjunction with formaldehyde both for the partial condensation and to complete the resin-forming reaction or in conjunction with furfural for the initial condensation and formaldehyde to complete the condensation.

The properties of the final dried composition of my invention are indicated by the following physical properties of an average unsupported 0.40 inch-thick film made in accordance with my invention: specific gravity at 25° C./25° C., 1.077; tensile strength, 3000 pounds per square inch; elongation at break, 300%; Shore hardness, 40; Bell brittle point, −45° F.

While I have shown preferred embodiments of my invention it is to be understood that it is susceptible of those modifications which are obviously within the spirit of the invention which is to be taken as limited only by the scope of the appended claims.

Having thus described my invention, what I claim and desire to protect by Letters Patent is:

1. A composition of matter comprising an aqueous mixture of dispersed polymerized chloroprene and dissolved partially condensed resorcinol-formaldehyde resin capable of setting to a substantially infusible, substantially insoluble state, said mixture also containing free alkali metal hydroxide as a catalyst for completion of the resin-forming reaction, the relative proportions of said polymerized chloroprene and said resin being such that the resorcinol content of said resin ranges from 6.75 to 15.0 per cent by weight based on the weight of polymerized chloroprene, said mixture containing at least 30 per cent but not over 50 per cent by weight of said polymerized chloroprene and said resin, said composition being capable of setting on standing to a friable gel condition which upon subsequent drying to remove the water yields a solid flexible material.

2. A composition of matter comprising an aqueous mixture of dispersed polymerized chloroprene and dissolved partially condensed resorcinol-formaldehyde resin capable of setting to a substantially infusible, substantially insoluble state, the relative proportions of said polymerized chloroprene and said resin being such that the resorcinol content of said resin ranges from 6.75 to 15.0 per cent by weight based on the weight of polymerized chloroprene, said mixture containing at least 30 per cent but not over 50 per cent by weight of said polymerized chloroprene and said resin, said resin resulting from the partial reaction of formaldehyde and resorcinol in a molar ratio of from 2:1 to 3:1 and being dissolved in aqueous alkali metal hydroxide solution, said mixture containing free alkali metal hydroxide as a catalyst for completion of the resin-forming reaction, said mixture also containing dispersed pigment and ammonium caseinate, said composition being capable of setting on standing to a friable gel condition which upon subsequent drying to remove the water yields a solid flexible material.

3. The process of making a solid flexible material which comprises formulating an aqueous mixture of dispersed polymerized chloroprene, dissolved partially condensed resorcinol-formaldehyde resin capable of setting to a substantially infusible, substantially insoluble state and free alkali metal hydroxide as a catalyst for completion of the resin-forming reaction, the relative proportions of said polymerized chloroprene and said resin being such that the resorcinol content of said resin ranges from 6.75 to 15.0 per cent by weight based on the weight of polymerized chloroprene, said mixture containing at least 30 per cent but not over 50 per cent by weight of said polymerized chloroprene and said resin, imparting to said mixture the final form desired, allowing said composition while in said form to set to a friable gel condition prior to substantial evaporation of water, subsequently drying the resulting gelled material to remove the water therefrom, and maintaining the relative positions of the various portions of said material in undisturbed relative relationship during said gelling step and during the major portion of said drying step.

4. The process of making a solid flexible material which comprises formulating an aqueous mixture of dispersed polymerized chloroprene, dissolved partially condensed resorcinol-formaldehyde resin capable of setting to a substantially infusible, substantially insoluble state and free alkali metal hydroxide as a catalyst for completion of the resin-forming reaction, the relative proportions of said polymerized chloroprene and said resin being such that the resorcinol content of said resin ranges from 6.75 to 15.0 per cent by weight based on the weight of polymerized chloroprene, said mixture containing at least 30 per cent but not over 50 per cent by weight of said polymerized chloroprene and said resin, allowing said composition to set to a friable gel condition prior to substantial evaporation of water, and subsequently drying the resulting material to remove the water therefrom.

5. A composition of matter comprising a solid flexible material resulting from gelling to a friable gel condition prior to substantial evaporation of water followed by drying of an aqueous mixture of dispersed polymerized chloroprene, dissolved partially condensed resorcinol-formaldehyde resin capable of setting to a substantially infusible, substantially insoluble state and free alkali metal hydroxide as a catalyst for completion of the resin-forming reaction, the relative proportions of the polymerized chloroprene and said resin being such that the resorcinol content of said resin ranges from 6.75 to 15.0 per cent by weight based on the weight of polymerized chloroprene, said mixture containing at least 30 per cent but not over 50 per cent by weight of said polymerized chloroprene and of said resin.

6. A new article of manufacture comprising a continuous sheet-like flexible material formed by gelling to a friable gel condition prior to substantial evaporation of water and subsequent drying of an aqueous mixture of dispersed polymerized chloroprene, dissolved partially condensed resorcinol-formaldehyde resin capable of setting to a substantially infusible, substantially insoluble state and free alkali metal hydroxide as a catalyst for completion of the resin-forming reaction, the relative proportions of the polymerized chloroprene and said resin being such that the resorcinol content of said resin ranges from 6.75 to 15.0 per cent by weight based on the weight of polymerized chloroprene, said mixture containing at least 30 per cent but not over 50 per cent by weight of said polymerized chloroprene and of said resin.

7. A new article of manufacture comprising a sheet-like flexible material comprising a sheet of textile fabric in intimate association with a continuous layer of a solid flexible material formed by gelling to a friable gel condition prior to substantial evaporation of water and subsequent drying while in contact with said textile fabric of an aqueous mixture of dispersed polymerized chloroprene, dissolved partially condensed resorcinol-formaldehyde resin capable of setting to a substantially infusible, substantially insoluble state and free alkali metal hydroxide as a catalyst for completion of the resin-forming reaction, the relative proportions of the polymerized chloroprene and said resin being such that the resorcinol content of said resin ranges from 6.75 to 15.0 per cent by weight based on the weight of polymerized chloroprene, said mixture containing at least 30 per cent but not over 50 per cent by weight of said polymerized chloroprene and of said resin.

8. A composition of matter comprising an aqueous mixture of dispersed elastic rubbery material selected from the group consisting of rubbery copolymer of butadiene and styrene, rubbery copolymer of butadiene and acrylonitrile, rubbery copolymer of isoprene and styrene and polymerized chloroprene, vulcanizing ingredients being included in the mixture when one of said rubbery copolymers is employed, dissolved partially condensed resin made by the partial condensation of a polyhydric phenol having hydroxyl groups in the 1- and 3-positions with an aldehyde and capable of setting to a substantially infusible, substantially insoluble state and free alkali metal hydroxide as a catalyst for completion of the resin-forming reaction, the relative proportions of said rubbery material and said resin being such that the polyhydric phenol content of said resin ranges from 6.75 to 15.0% by weight based on the weight of said elastomeric material and said resin, said mixture containing at least 30 per cent but not over 50 per cent by weight of said rubbery material and said resin, said composition being capable of setting on standing to a friable gel condition which upon subsequent drying to remove the water yields a solid flexible material.

9. The process of making a solid flexible material which comprises formulating an aqueous mixture of dispersed elastic rubbery material selected from the group consisting of rubbery copolymer of butadiene and styrene, rubbery copolymer of butadiene and acrylonitrile, rubbery copolymer of isoprene and styrene and polymerized chloroprene, vulcanizing ingredients being included in the mixture when one of said rubbery copolymers is employed, dissolved partially condensed resin obtained by the partial condensation of a polyphydric phenol having hydroxyl groups in the 1- and 3-positions and an aldehyde and capable of setting to a substantially infusible, substantially insoluble state and free alkali metal hydroxide as a catalyst for completion of the resin-forming reaction, the relative proportions of said rubbery material and said resin being such that the polyhydric phenol content of said resin ranges from 6.75 to 15.0% by weight based on the weight of said rubbery material, said mixture containing at least 30% but not over 50 per cent by weight of said rubbery material and said resin, allowing said composition to set to a friable gel condition prior to substantial evaporation of water, and subsequently drying the resulting material to remove the water therefrom.

10. A composition of matter comprising a solid flexible material resulting from gelling to a friable gel condition prior to substantial evaporation of water followed by drying of an aqueous mixture of dispersed elastic rubbery material selected from the group consisting of rubbery copolymer of butadiene and styrene, rubbery copolymer of butadiene and acrylonitrile, rubbery copolymer of isoprene and styrene and polymerized chloroprene, vulcanizing ingredients being included in the mixture when one of said rubbery copolymers is employed, dissolved partially condensed resin obtained by the partial condensation of a polyhydric phenol having hydroxyl groups in the 1- and 3-positions and an aldehyde and capable of setting to a substantially infusible, substantially insoluble state and free alkali metal hydroxide as a catalyst for completion of the resin-forming reaction, the relative proportions of said rubbery material and said resin being such that the polyhydric phenol content of said resin ranges from 6.75 to 15.0% by weight based on the weight of said rubbery material, said mixture containing at least 30% but not over 50 per cent by weight of said rubbery material and said resin.

JACK S. ROSS.

REFERENCES CITED

The following references are of record in the file of this patent:

UNITED STATES PATENTS

| Number | Name | Date |
|---|---|---|
| 2,128,635 | Charch et al. | Aug. 30, 1938 |
| 2,429,397 | Compton et al. | Oct. 21, 1947 |

Certificate of Correction

Patent No. 2,481,879 September 13, 1949

JACK S. ROSS

It is hereby certified that error appears in the printed specification of the above numbered patent requiring correction as follows:

Column 7, line 69, for "resonant rubber" read *resin and rubber*;

and that the said Letters Patent should be read with this correction therein that the same may conform to the record of the case in the Patent Office.

Signed and sealed this 17th day of January, A. D. 1950.

[SEAL]

THOMAS F. MURPHY,
*Assistant Commissioner of Patents.*